United States Patent [19]
Wortham

[11] 3,892,846
[45] July 1, 1975

[54] ANIMAL LITTER RESISTANT TO AMMONIA ODOR FORMATION
[75] Inventor: Joseph S. Wortham, Lake City, Fla.
[73] Assignee: Allied Chemical Corporation, New York, N.Y.
[22] Filed: Sept. 12, 1972
[21] Appl. No.: 288,470

Related U.S. Application Data
[63] Continuation-in-part of Ser. No. 47,904, June 19, 1970, abandoned.

[52] U.S. Cl. ................................................ 424/76
[51] Int. Cl. ............................................ A61l 13/00
[58] Field of Search ........................................ 424/76

[56] References Cited
UNITED STATES PATENTS
2,597,457  5/1952  Cook .................................. 119/1
3,427,316  2/1969  Wakeman et al. .................. 260/286

FOREIGN PATENTS OR APPLICATIONS
729,204  12/1942  Germany

OTHER PUBLICATIONS
Kobashi et al., Biochem. Biophys. Acta., 65:380–383, (1962), "Specific Inhibition of Urease by Hydroxamic Acids".
Fishbein et al., Nature, 208:46–48, Oct. 2, 1965, "Acetohydroxamate:Bacterial Urease Inhibitor with Therapeutic Potential in Hyperammonaemic States".
Kobashi et al., Biochem. Biophys. RBS Comm., 23(1):34–38, (1966), "Evidence for the Formation of an Inactive Urease Hydroxamic Acid Complex".

Primary Examiner—Shep K. Rose

[57] ABSTRACT

Animal bedding materials, animal litter, training pads and the like, treated with an hydroxamic acid or hydroxamic acid salt in amount sufficient to inhibit the decomposition of urea to ammonia when wetted with urine.

17 Claims, No Drawings

SPINAL ANESTHESIA IN SHEEP, SEGMENTAL REGRESSION – VOLUME: 1 ml

ANIMAL LITTER RESISTANT TO AMMONIA ODOR FORMATION

CROSS REFERENCE TO RELATED APPLICATIONS

This application is a continuation-in-part of the co-pending application in the name of the inventor, Ser. No. 47,904, filed June 19, 1970, now abandoned, and entitled "Odor-Inhibiting Composition and Method". It is also related to the co-filed continuation-in-part application Ser. No. 281,896, filed Aug. 18, 1972 in the name of the inventor, attorney's docket No. 5400-1287, entitled "Diaper Resistant to Ammonia Odor Formation", now abandoned.

BACKGROUND OF THE INVENTION

1. Field of the Invention

This invention relates to animal bedding materials, animal litter, and urine absorbent training pads which are resistant to ammonia formation when wet with urine, thereby greatly reducing the unpleasant odor associated with the decomposition of urea.

2. Description of the Prior Art

Such materials as straw, hay, wood shavings, ground clay, absorbent paper and absorbent pads are used for animals which are kept indoors. These are used for absorbing urine, and retaining droppings to render the disposal of such excrement somewhat less unpleasant. Since these absorbent materials are retained indoors for short periods, decomposition of the urea contained in the urine creates a problem, for it produces ammonia, which is largely responsible for the unpleasant odor associated with such contaminated absorbents.

Heretofore, the general approach has been to employ germicides to destroy the bacteria responsible for the decomposition of the urea, but frequently the cure is almost as irritating as the ammonia it is meant to eliminate. Furthermore, the volume of urine is usually so great as to render safe quantities of germicides relatively ineffective. Furthermore, the destruction of the bacteria is not necessarily the best approach, for their ability to decompose organic waste matter serves a useful purpose in the ecological balance.

Until recent years it was assumed that the bacteria acted directly on the urea to bring about its decomposition, but it is now clear that the mechanism involves the production of the enzyme urease by the bacteria, and that it is ultimately the enzyme which brings about the decomposition of the urea.

The general approach heretofore has been to use a bactericide, sufficiently potent and in sufficiently large quantities to act on the bacteria and inhibit their ability to produce the enzyme.

SUMMARY OF THE INVENTION

I have now discovered that animal litter, animal bedding, and absorbent pads, hereinafter to be designated as animal litter, can be rendered resistant to ammonia odor when wet with urine, by the incorporation of a small amount of an hydroxamic acid or hydroxamic acid salt, insufficient to be effective as a bactericide, and of such trace amount as to have no harmful effect on the animals associated therewith.

In accordance with the present invention, the animal litter comprises a urine-absorbent material containing at least one hydroxamic acid or salt of the acid, in an amount sufficient to inhibit the decomposition of urea to ammonia when wetted with urine. The preferred hydroxamic acids are those having the formula

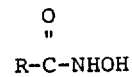

where R is an organic radical of 1 to 19 carbon atoms, desirably 2 to 10 carbon atoms, with the carbon atom of the acid radical bonded to a carbon atom of the organic radical.

The essential group in the compounds of the present invention is the

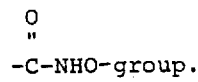

Accordingly, R in the above formula may be any compatible organic radical, preferably containing 1 to 19 carbon atoms, desirably 2 to 10 carbon atoms. The preferred radicals are aliphatic hydrocarbon radicals both substituted and unsubstituted, and cyclic hydrocarbon radicals, both substituted and unsubstituted. Illustrative of substituent groups are the halogen, hydroxyl, nitro, carbonyl, and alkoxy groups.

The large number of hydroxamic acid compounds listed under Description of the Preferred Embodiment are illustrative of the wide range of different organic radicals which may be combined with the above hydroxamic acid group.

Although very small quantities of these urease inhibiting compounds are effective and preferred, large quantities can be used, if desired, for an important advantage of the method of the present invention lies in its economy. Since the hydroxamic acids may be applied to the animal litter in substantially trace amounts, by very simple means, the method of the present disclosure provides an extremely low cost, yet highly effective operation.

Description of the Preferred Embodiment

Figure 1:
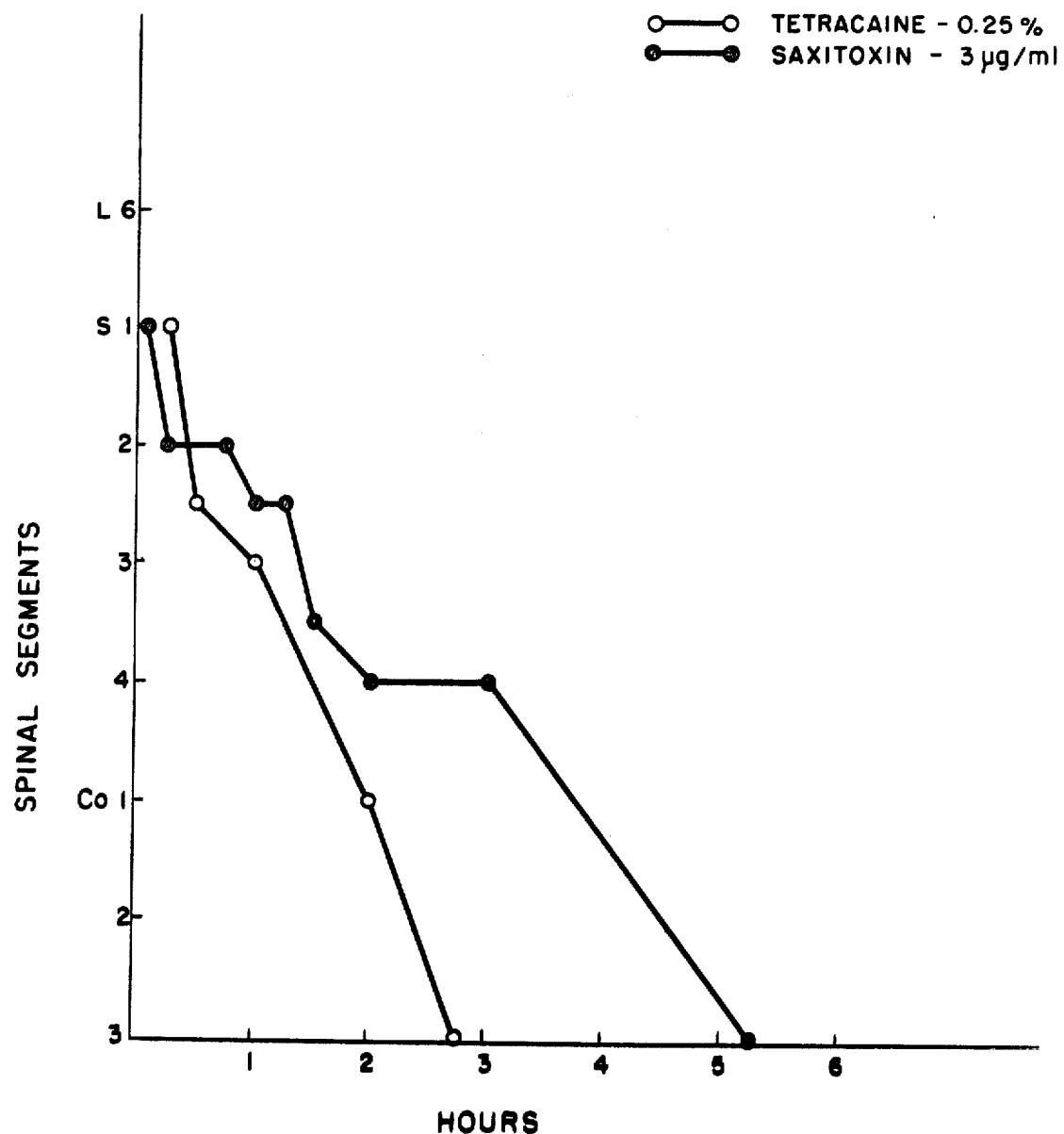

The present invention is directed to an animal litter produced from natural materials such as clay, saw dust, vermiculite, or paper, or from synthetics such as nylon or polyester (urine absorptive pads), containing a small amount, preferably between 0.005 and 0.00002 gram of at least one hydroxamic acid or salts thereof per 25 grams of animal litter. Among the applicable hydroxamic acid compounds are aceto-, propiono-, butyro-, capro-, heptylo-, octano-, nonylo-, caprino-, undecano-, phenylaceto-, benzo-, salicylo-, cinnamo-, adipo-, stearo-, and nicotino-hydroxamic acids, and the Al, Zn, Sn, Ca, Na, K and Mg salts of any of these.

The selected active hydroxamic acid compound can be applied to the animal litter with a carrier such as water, or together with one or more carriers such as finely divided powders, water-soluble solids and volatile solvents or fluids, compatible with the hydroxamic acid compound being applied. Among the many carriers which may be employed either singly or in combination, for applying the active hydroxamic acid compound to the animal litter, are water, ethanol, dioxane, dimethylsulfoxide, formamide, glycerine cyclohexanol and a water, oil and stain repellent composition comprising an aqueous emulsion containing a copolymer of fluoroisopropoxybutyl methacrylate and N- methylolacrylamide blended with 2-ethylhexylmethacrylate. The number of suitable carriers is very considerable but water is the preferred carrier or solvent.

There are many different ways in which the hydroxamic acid compound and its carrier may be applied to the animal litter. Preferably, the compound is applied as an aqueous solution in an amount sufficient to leave deposited between 0.005 and 0.00002 gram of the inhibiting hydroxamic acid compound per 25 grams of animal litter. It may be applied to the dry litter or to litter which has been pre-dampened with solvent. It may be applied as a solution or as a spray. It may also be applied as a powder, preferably containing 0.01 to 2.0 grams per 1000 grams of composition, or as a solvent solution. It may also be applied as a surface-applied spray.

A convenient method of applying the inhibitor is by wetting the absorbent material with a composition consisting substantially of an aqueous solution of the hydroxamic acid compound containing about 0.005 to 2.0 grams of the compound per liter of water. If desired, the hydroxamic acid solution may be dried on the absorbent material, but this is not essential to the invention.

With one embodiment of the invention, the hydroxamic acid solution is adjusted to a pH of about 7 by the addition of an alkaline pH modifying substance.

EXAMPLE 1

A series of tests are run to illustrate the inhibiting effect of several different hydroxamic acids, using the following procedure:

25 Grams of ground Tennessee clay of the type commonly used in animal litter is placed in each of several 125cc Erlenmeyer flasks, together with 24.9 ml of urine, 0.1 ml of a solution of urease, and 0.4 ml of a solution of 0.02 gram of one of several hydroxamic acids, thus introducing 0.00008 gram of the hydroxamic acid urease inhibitor, representing 0.0000032 gram per gram of litter. The mouth of the flask is then sealed with wax paper, and incubated for 3 hours in a water bath at 37°C. The urease solution referred to above is a commercially available extract of urease with glycerol, obtainable from the Harleco Co. of Philadelphia.

A control flask is prepared with a similar quantity of ground clay and urine but containing no hydroxamic acid inhibitor.

A filtered aliquot portion of the contents of each flask is taken and analyzed for ammonia, the product of the action of the urease on the urea content of the urine. There are a variety of procedures for determining the ammonia, but the method here applied was that of Beecher and Whitten, Analy. Biochem. 36, 253, (1970).

An alternate analytical method is frequently applied as a check. In applying this test method, the quantity of urea originally present was determined, and compared with that remaining undecomposed at the end of the incubation period. The procedure used is the "Method for Determination of Urea", given by H. L. Rosenthal, Analy. Chem. 27, p. 1980 (1957).

This test is more time consuming than that for ammonia, but considered more precise since it is not subject to variations which might result from losses of ammonia. No significant losses are noted however.

In the tabulation to follow, the inhibitor tested as described above is given, followed by the micrograms of ammonia per ml found by analysis. The figure given is generally the average of several individual determinations. Finally, the "percent inhibition" is given.

$$\% \text{ inhibition} = \frac{A-B}{A} \times 100$$

when

A=micrograms of ammonia ($NH_3$) per ml found in control containing no inhibitor, less the small amount of $NH_3$ normally found in the urine sample per ml, and B=micrograms of $NH_3$ per ml found in test flask containing the inhibitor being evaluated, less the small amount of $NH_3$ normally found in the urine sample per ml.

Even in concentrations this low, where the amount of inhibitor used is only $3.2 \times 10^{-6}$ grams per ml of urine, the enzymatic action of the urease is inhibited to a considerable degree, as is evident in the following table:

TABLE I

Inhibiting Effect of Various Hydroxamic Acids
Incubation Period, 3 hours at 37°C.

| Inhibitor | Micrograms $NH_3$/ ml urine | % Inhibition |
|---|---|---|
| Control | 1563 | 0 |
| DL-α-aminopropionohydroxamic acid | 844 | 46 |
| Benzohydroxamic acid | 1079 | 31 |
| Butyrohydroxamic acid | 1188 | 24 |
| Caprohydroxamic acid | 908 | 42 |
| p-Carboxycinnamohydroxamic acid | 766 | 51 |
| Cinnamohydroxamic acid | 829 | 47 |
| Heptylohydroxamic acid | 641 | 59 |
| Nicotinohydroxamic acid | 891 | 43 |
| m-Nitrobenzohydroxamic acid | 1031 | 34 |
| Octanohydroxamic acid | 594 | 62 |
| Phenylacetohydroxamic acid | 1001 | 36 |

EXAMPLE 2

The following test illustrates the enzymatic action of the urease on the urea content of the animal litter and also the effect of doubling the quantity of hydroxamic acid inhibitor. The following procedure was used:

Into each of five numbered 125 cc Erlenmeyer flasks is added 25 grams of Tennessee clay. All of these portions of clay were pre-sterilized with heat, except for that portion added to flask No. 3, which is deliberately contaminated with a bit of animal excrement.

A 24 ml quantity of urine are now added to all five flasks. To flask No. 4 is added 0.4 ml of a solution of 0.02 grams of cinnamohydroxamic acid made up to 100 ml, and to flask No. 5, 0.8 ml of the same solution, thus flask No. 4 contains $8 \times 10^{-5}$ grams of cinnamohydroxamic acid and flask No. 5, $1.6 \times 10^{-4}$ grams.

Next, a 0.1 ml portion of the urease solution as defined in Example 1 is added to flasks No. 1, 4 and 5. All flasks are then made up to 25 ml, sealed with wax paper and incubated for 3 hours at 37°C. A filtered aliquot portion of the contents of each flask is taken and tested for ammonia by the procedure given in Example 1. The results are tabulated in Table II below:

TABLE II

Inhibiting Effect of Cinnamohydroxamic Acid
Incubation Period, 3 hours at 37°C.

| Flask No. | Inhibitor | Micrograms NH₃/ ml urine | Percent Inhibition |
|---|---|---|---|
| 1 | Control (urease, but no inhibitor, sterile litter) | 1489 | 0 |
| B | Control (no urease, no inhibitor, sterile litter) | 0 | 100 |
| 3 | Control (no urease, no inhibitor, contaminated litter) | 1487 | 0 |
| 4 | Cinnamohydroxamic acid – 8 × 10⁻⁵ gr + urease + sterile litter | 805 | 46 |
| 5 | Cinnamohydroxamic acid – 1.6 × 10⁻⁴ gr + urease + sterile litter | 327 | 78.2 |

In flask No. 1, as expected, the unhibited urease decomposes the urea in the urine. Flask No. 2 dramatically demonstrates that when urease is absent, there is substantially no decomposition of the urea content of the urine even though there is no inhibitor present, and the urine has been incubated. This is in contrast with flask No. 3 which, like flask No. 2, contains neither inhibitor nor urease. There is no evidence of inhibition of the decomposition of urea in the case of flask No. 3 at all, yet the only difference is that the litter is not sterile. The probable answer is that the bacteria introduced with the contaminated litter produces the enzyme urease, just as they oridinarily do in the case of urine wetted litter. Since there is no inhibitor present, the urease produced in situ brings about decomposition of the urea. Since urine is normally sterile, and the other additives in the test are substantially sterile, the bacterium count is insufficient to produce an appreciable quantity of the enzyme.

Flask No. 4 containing both urease and $8 \times 10^{-5}$ grams of inhibitor, shows 46% inhibition, whereas flask No. 5, wherein the quantity of inhibitor has been doubled, shows 78.2% inhibition. Doubling the quantity of inhibitor in this instance resulted in an improvement of about 70%.

EXAMPLE 3

Various salts of several different hydroxamic acids are prepared as urease inhibitors for use in the example to follow. The method of preparing these salts follows the pattern here given for the preparation of the aluminum salt of cinnamohydroxamic acid.

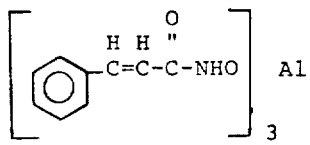

5 Grams of cinnamohydroxamic acid are dissolved in 30 ml. of ethanol, and the stoichiometric amount of aluminum acetate is dissolved in 50 ml. of water. The two solutions are mixed with stirring, and the white precipitate formed, filtered off and washed with a small amount of cold water. The white product is dried under vacuum at room temperature.

Although quite pure, the product may be further purified by dissolving it in 50 ml of water acidified to pH 2.0 with HCl, filtering, reprecipitating, filtering off the precipitate, washing with cold water and drying under vacuum at room temperature.

|  | Analysis | Theory |
|---|---|---|
| Carbon | 62.7 | 63.1 |
| Hydrogen | 4.6 | 4.7 |
| Oxygen | 18.8 | 18.7 |
| Nitrogen | 8.1 | 8.2 |
| Aluminum | 5.3 | 5.3 |

EXAMPLE 4

A series of tests are run on cinnamohydroxamic acid, benzohydroxamic acid and on a number of salts of these two acids, using the following procedure:

A 24 ml quantity of urine is placed in each of several 50cc Erlenmeyer flasks, together with 0.4 ml of a solution of 0.02 gram of the selected acid made up to 100 ml with water, or of the acid salt made up to 100 ml with water acidified to pH 1 to 2 with HCl. A 0.1 ml portion of the urease solution, previously defined, is added to each mixture which is then brought to 25 ml with water. The mouths of the flasks are sealed with wax paper, and the contents incubated in a constant temperature water bath for 3 hours at 37°C. Control flasks are prepared and similarly treated. These are identical in all respects, except that they do not contain inhibitor. An aliquot of each solution is taken and analyzed for ammonia as in Examples 1 and 2. The results are tabulated below in Table III.

TABLE III

Inhibiting Effect of Various Hydroxamic Acid Salts. Incubation Period, 3 hours at 37°C. Inhibitor $8.0 \times 10^{-3}$ grams/25 ml urine

| Inhibitor |  | Micrograms NH₃ /ml urine | % Inhibition |
|---|---|---|---|
| Control | (no inhibitor) (Average) | 1508 | 0 |
| Al salt, | Cinnamohydroxamic acid | 197 | 87 |
| Ca salt, | Cinnamohydroxamic acid | 378 | 75 |
| Zn salt, | Cinnamohydroxamic acid | 408 | 73 |
| Mg salt, | Cinnamohydroxamic acid | 649 | 57 |
| Na salt, | Cinnamohydroxamic acid | 844 | 44 |
| Sn salt, | Cinnamohydroxamic acid | 544 | 64 |
| Al salt, | Benzohydroxamic acid | 1222 | 19 |
| Ca salt, | Benzohydroxamic acid | 408 | 73 |
| Zn salt, | Benzohydroxamic acid | 422 | 72 |
| Mg salt, | Benzohydroxamic acid | 228 | 85 |
| Na salt, | Benzohydroxamic acid | 1282 | 15 |
| Sn salt, | Benzohydroxamic acid | 529 | 65 |
| Cinnamohydroxamic acid (for comparison) |  | 830 | 45 |
| Benzohydroxamic acid (for comparison) |  | 1161 | 23 |

It will be noted from the above that generally speaking, with the possible exception of the salts of the alkali metals, the metallic salts are superior to the acids as urease inhibitors. It will also be noted that there is considerable variation in the effectiveness of the salts, with the aluminum salt of cinnamohydroxamic acid and the magnesium salt of benzohydroxamic acid being particularly outstanding. The calcium salts of both acids, it will also be noted, are high on the list of effective urease inhibitors.

EXAMPLE 5

A series of tests are run in the presence of a variety of solvents to determine the effect of the solvents on the inhibiting action of cinnamohydroxamic acid. The purpose of these tests is to determine whether the acid can be applied to the litter as a solution in such solvents without detriment to its inhibiting action. Each test consists of 23 ml of urine in a 50 cc Erlenmeyer, 0.1 ml urease solution as previously defined, $1.6 \times 10^{-4}$ gr. cinnamohydroxamic acid, and 1.0 ml of the indicated solvent, with the mixture being made up to 25 ml with water. The cinnamohydroxamic acid concentration is identical in all tests. As before, the flasks are sealed with wax paper and incubated at 37°C. for 3 hours. An aliquot portion is analyzed for urea according to the Rosenthal method of Example 1. A control is also prepared and treated in an identical manner, with the exception that it contains neither a solvent nor the cinnamohydroxamic acid inhibitor. The results are given below in Table IV:

TABLE IV

Effects of Various Solvents on the Urease Inhibiting Effect of Cinnamohydroxamic Acid

| Solvent | Mg of Urea Degraded | % of Inhibition |
|---|---|---|
| Control (No cinnamohydroxamic acid) | 3.78 | 0 |
| Water | 0.53 | 86 |
| Ethanol | 1.40 | 63 |
| Dioxane | 0.98 | 74 |
| Dimethylsulfoxide | 1.47 | 61 |
| Formamide | 1.44 | 62 |
| Glycerine | 1.55 | 59 |
| Cyclohexanol | 1.06 | 72 |
| Acrylic water, oil and stain repellent (previously defined) | 0.04 | 98 |

It will be noted that although some organic solvents tend to reduce the effectiveness of the inhibitor, they may if desired, be used without serious detriment. Water, and the aqueous emulsion of an acrylic stain repellent previously defined are outstanding solvents for the application of the inhibitor.

The results tabulated in Table IV appear higher than those given for cinnamohydroxamic acid in Tables I and II. This improvement in part reflects the larger quantity used. When $1.6 \times 10^{-4}$ grams of cinnamohydroxamic acid was used rather than $8 \times 10^{-5}$ as in Table I, the percent inhibition increased from 47 to 86%. Furthermore, the results are effected by various factors, as for example, the composition of the urine samples, the incubation period, the quantity of inhibitor used within the defined limits, the solvent used, and the hydroxamic acid compound employed.

EXAMPLE 6

Samples of various animal bedding materials, absorbent pads and animal litter are treated with aqueous solutions of the aluminum salt of cinnamohydroxamic acid (Al-CHA), and the magnesium salt of benzohydroxamic acid (Mg-BHA).

Solutions of 0.02 gram of each in 100 ml are prepared and sprayed on the bedding, pads and litter material, using 1.6 ml of solution per 100 grams of litter, thus depositing about 0.0000032 gram of the inhibitor per gram of litter. The sprayed materials are then dried and wetted with urine at the rate of 25 ml. per 100 grams of material.

Controls not treated with the inhibiting complexes are similarly wetted with urine, and both tests and controls are incubated at 37°C. for three hours, then examined.

Those tests which are carried out on materials pretreated with the compounds provide only a very faint unpleasant odor, whereas the untreated controls reek of ammonia. The following table indicates the results obtained.

TABLE II

Inhibiting Effect of Al—CHA and MG—BHA on Animal Bedding, Pads and Litter Materials (25 ml Urine/100 Grams — Incubated Three Hours at 37°C.

| Material | Inhibitor | Result |
|---|---|---|
| Bedding Straw | Al—CHA | Faint odor |
| Bedding Straw | Mg—BHA | Faint odor |
| Bedding Straw | No inhibitor (control) | Foul odor—NH₃ |
| Pine Shavings | Al—CHA | Faint odor |
| Pine Shavings | Mg—BHA | Faint odor |
| Pine Shavings | No inhbitor (control) | Foul odor—NH₃ |
| Cedar Shavings | Al—CHA | Faint odor |
| Cedar Shavings | Mg—BHA | Faint odor |
| Cedar Shavings | No inhibitor (control) | Foul odor—NH₃ |
| Tennessee Clay | Al—CHA | Faint odor |
| Tennessee Clay | Mg—BHA | Faint odor |
| Tennessee Clay | No inhibitor (control) | Foul odor—NH₃ |
| Absorptive Pads | Al—CHA | Faint odor |
| Absorptive Pads | Mg—BHA | Faint odor |
| Absorptive Pads | No inhibitor (control) | Foul odor—NH₃ |

Al—CHA: Aluminum salt of cinnamohydroxamic acid
Mg—BHA: Magnesium salt of benzohydroxamic acid
Pine shavings and cedar shavings marketed for hamsters, white rats, mice, etc.
Tennessee Clay — as used in many marketed animal litters.
Absorptive pads — as marketed for use in house-breaking puppies.

The hydroxamic acids, and particularly the metallic salts of many of these acids have a high degree of potency as urease inhibitors, yet are substantially nontoxic. Accordingly, very little of these substances need be added to the animal litter to render it resistant to ammonia production. The treatment accordingly is quite inexpensive.

These inhibiting innocuous substances are not appreciably volatile, and retain their efficacy for long periods of time.

Since certain changes can be made in preparing and applying the compositions of this disclosure without departing from the scope of the invention, it is intended that all matter contained in the above description shall be interpreted as illustrative and not in a limiting sense.

I claim:

1. An animal litter comprising a urine-absorbent material containing a salt selected from the group consisting of Al, Zn, Sn, Ca and Mg of an hydroxamic acid, in an amount sufficient to inhibit the decomposition of urea to ammonia when wetted by urine.

2. The animal litter of claim 1 in which the hydroxamic acid is selected from the group consisting of those having the formula

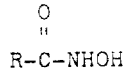

wherein R is an organic radical containing 1 to 19 carbon atoms, with the carbon atom of the acid radical bonded to a carbon atom of the organic radical.

3. The animal litter of claim 2 wherein R has 2–10 carbon atoms.

4. The animal litter of claim 1 wherein the hydroxamic acid is selected from the group consisting of aceto-, propiono-, butyro-, amylo-, capro-, heptylo-, octano-, nonylo-, caprino-, undecano-, phenylaceto-, benzo-, salicylo-, adipo-, stearo- and nicotino-hydroxamic acid.

5. The animal litter of claim 4 wherein the hydroxamic acid is cinnamohydroxamic acid.

6. The animal litter of claim 4 wherein the hydroxamic acid is benzohydroxamic acid.

7. The animal litter of claim 1 wherein the amount of the salt of the hydroxamic acid used in the animal litter is insufficient for substantial effectiveness as a bactericide.

8. The animal litter of claim 1 wherein the amount of hydroxamic acid used in the animal litter ranges between about 0.005 to 0.00002 gram per 25 grams of litter.

9. The animal litter of claim 1 wherein the animal litter is clay.

10. The animal litter of claim 1 wherein the animal litter is comprised of wood particles.

11. The animal litter of claim 1 wherein the litter comprises absorbent pads.

12. The animal litter of claim 4 wherein the salt is Al.

13. The animal litter of claim 4 wherein the salt is Zn.

14. The animal litter of claim 4 wherein the salt is Sn.

15. The animal litter of claim 4 wherein the salt is Ca.

16. The animal litter of claim 4 wherein the salt is Mg.

17. The animal litter of claim 5 wherein the salt is Al.

* * * * *